(12) United States Patent
Kalker et al.

(10) Patent No.: US 7,653,739 B1
(45) Date of Patent: Jan. 26, 2010

(54) CONTROLLING TRANSFER OF ACCESS TO DATA

(75) Inventors: Antonius Kalker, Palo Alto, CA (US); Alan H. Karp, Palo Alto, CA (US); Ashwin Swaminathan, Greenbelt, MD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 11/796,215

(22) Filed: Apr. 27, 2007

(51) Int. Cl.
*G06F 15/16* (2006.01)

(52) U.S. Cl. .................. 709/232; 709/201; 709/212; 709/217; 709/219; 709/225; 709/229

(58) Field of Classification Search .................. 709/201, 709/217, 225, 229, 219, 212, 232
See application file for complete search history.

(56) References Cited

U.S. PATENT DOCUMENTS

| | | | |
|---|---|---|---|
| 6,813,358 B1 * | 11/2004 | Di Crescenzo et al. | 380/280 |
| 2002/0194337 A1 * | 12/2002 | Knight et al. | 709/225 |
| 2005/0021398 A1 * | 1/2005 | McCleskey et al. | 705/14 |

* cited by examiner

*Primary Examiner*—Michael Won

(57) ABSTRACT

A method for controlling transfer of data is provided. The method includes accessing data at a first device and accessing a time attribute associated with the data at the first device. The method further includes comparing the time attribute to a data transfer time threshold and in response to the time attribute associated with the data at the first device is less than the data transfer time threshold, the method further includes restricting access of the data at a second device.

20 Claims, 5 Drawing Sheets

CONTROLLING TRANSFER OF ACCESS TO DATA

TECHNICAL FIELD

The present invention is related to data processing. More specifically, embodiments of the present invention are related to controlling the transfer of access to data.

BACKGROUND

The Doctrine of First Sale (DoFS) is an exception to copyright law that enables an end user to sell or give away a copy of copyrighted work. The DoFS is accepted by copyright holders partially because transfer of physical objects from one person to another is inherently bound by the laws of physics, essentially limiting the speed by which the object can be transferred from one person to another.

For this same reason, there is opposition to apply the DoFS to the virtual world such as digital copyrighted work. With digitized copyrighted work, the transfer from one person or location to another only takes the push of a button, thus increasing the speed by which the transfer can occur.

SUMMARY OF THE INVENTION

Embodiments of the present invention include a method for controlling transfer of data. The method includes accessing data at a first device and accessing a time attribute associated with the data at the first device. The method further includes comparing the time attribute to a data transfer time threshold and in response to the time attribute associated with the data at the first device is less than the data transfer time threshold, the method further includes restricting access of the data at a second device.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Figure 1:
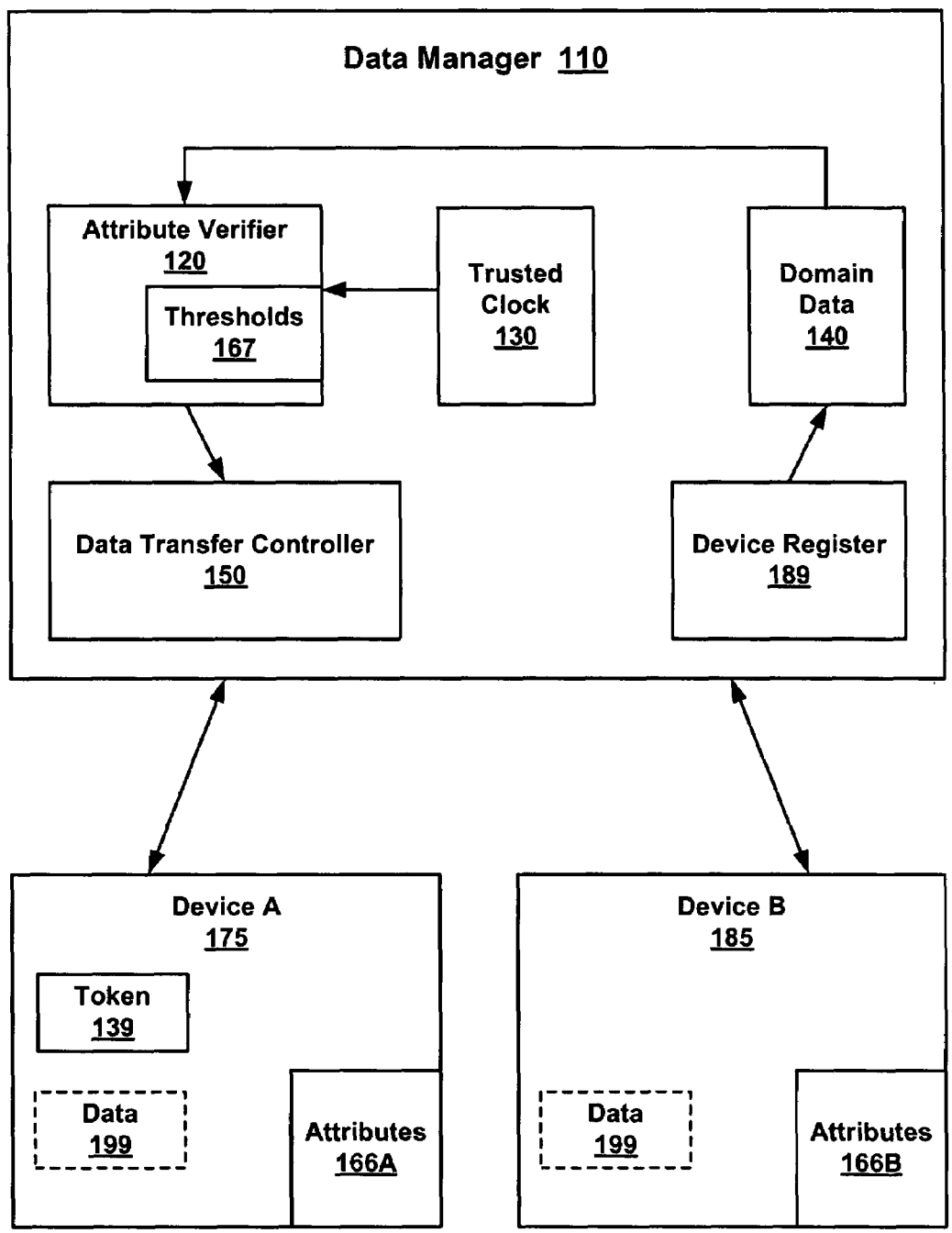
FIG. 1 is a block diagram of an exemplary system for controlling transfer of access to data in accordance with embodiments of the present invention.

Reference will now be made in detail to embodiments of the present invention, a system and method for controlling transfer of data, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention use the concept of "time-friction" to slow the transfer of access to data from one device or person to another. For example, embodiments of the present invention enable transfer of data from one device to another after a threshold time period has passed. In other words, embodiments of the present invention enable the DoFS to be applied to digital content by mimicking the physical constraints of transferring content from one person or device to another.

In another embodiment of the invention, the concept of a device domain is used to enable transfer of access to data from one device to another without waiting for a threshold time to pass. For example, a user may have two or more devices associated with a particular device domain. In this example, a user may access (e.g., play, execute) content on any one of the devices in the domain at any particular time. In addition, a user can transfer the content from one device in the domain to another device in the domain without any restrictions.

In one embodiment, once data is stored on a particular device, it is time stamped. In one embodiment, it is time stamped by a trusted clock (e.g., third party clock). If a user wishes to transfer the content to another device (e.g., give it to a friend), a time period must pass before the content can be transferred. For example, content can only be transferred once per day.

In another embodiment of the invention, the media itself is not actually transferred. In this embodiment, a virtual copy of the data may reside on more than one device simultaneously. For a user to access the data, a token must be used. When transferring access to the data, the token may only be transferred in one embodiment. Embodiments of the present invention ensure that copyright requirements are followed and that only one device belonging to a domain of devices is enabled to access the content at any one time.

FIG. 1 is a block diagram of an exemplary system for controlling transfer of access to data in accordance with embodiments of the present invention. In one embodiment of the invention, the data manager 110 controls the transfer of data between device A 175 and device B 185. In one embodiment, the data manager 110 uses time friction to slow the time it takes to transfer the data from one device to another.

For example, a particular item of data may only be allowed to be transferred once per day. In this instance, the data manager 110 would only allow the data to be transferred from one device to another one time every 24 hours. In one embodiment, a time stamp is associated with data when it is transferred to a device. The data transfer controller 150 compares the time attribute associated with the data to the threshold time in thresholds 167. If the time is later than the threshold, the data is enabled to be transferred. If the time is earlier than the threshold, the data is restricted from transfer.

The data manager 110 includes an attribute verifier 120 for verifying attributes associated with devices and data. In one embodiment, the attribute verifier 120 includes a threshold data store 167. The threshold data store 167 includes information such as data transfer time thresholds for data. In one embodiment, the data manager 110 also includes a trusted clock 130.

The trusted clock 130 provides the time stamp information when data is transferred from one device to another. It is appreciated that the trusted clock 130 may not be part of the data manager 110 and could reside in any location, and accessible, for example, over the Internet.

The data manager 110 also includes domain data 140. In one embodiment, data can be shared and/or transferred to a number of devices in a trusted domain of devices without requiring a time threshold to be satisfied. For example, a user may want to transfer data 199 from device A 175 to device B 185. If the devices are in the same domain, the user should be able to transfer the data 199 from one device to another without restrictions.

Devices can be registered as part of the same domain by the device register 189. The data transfer controller 150 would recognize two devices as having the same domain attributes and allow transfer of data between devices with matching domain data without restriction.

Data 199 is dotted because the data 199 may reside on both device A 175 and device B 185 simultaneously, however the data 199 is only accessible at one device at any time. In one embodiment, the data is referred to as a virtual copy because it may reside on the device, but it is not accessible without a token 139, for example. In one embodiment, access to data can be transferred from one device to another without actually transferring the actual data.

In one embodiment, when transferring data 199 from device A 175 to device B 185 the token 139 is transferred from device A 175 to device B 185 to enable access to data 199. The token enables device B 185 to access data 199. Without the token 139, device A 175 is prevented from accessing the data 199.

It is appreciated that the data transfer controller 150 of the data manager uses attributes 166A and 166B to control the transfer of data between devices 175 and 185. It is appreciated that the attributes 166A and 166B may include both device attributes and data attributes such as time attributes and domain attributes. The attributes 166A and 166B may reside in a plurality of locations. For example, data attributes may be stored with the data itself.

Figure 2:
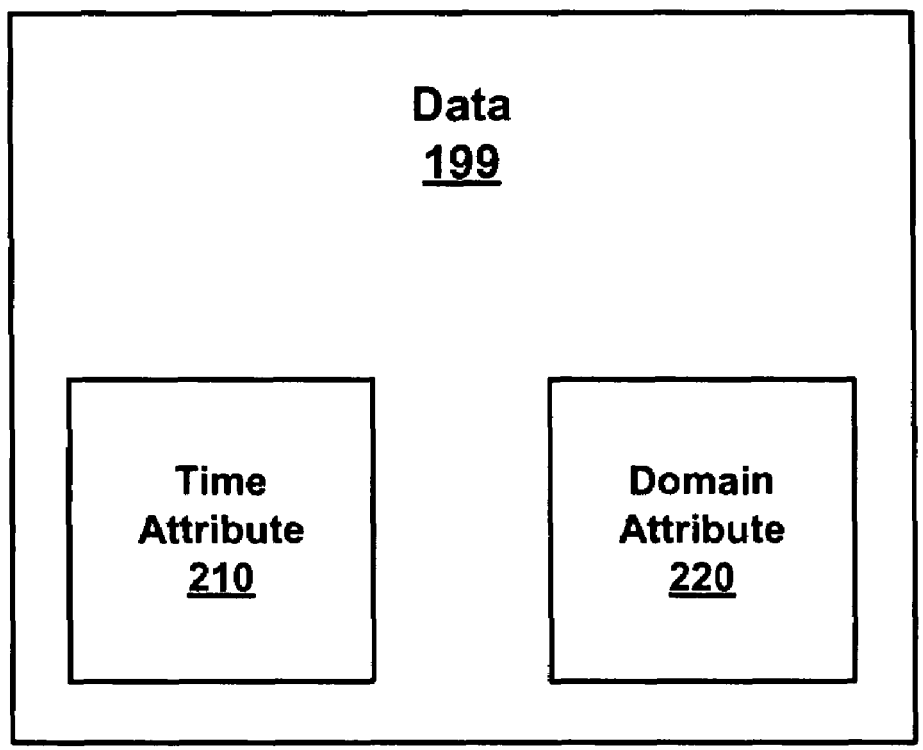
FIG. 2 is a block diagram of an exemplary data format including a time attribute and a domain attribute that can be used to control the transfer of access to data in accordance with embodiments of the present invention.

FIG. 2 is a block diagram of an exemplary data format including a time attribute 210 and a domain attribute 220 that can be used to control the transfer of access to data in accordance with embodiments of the present invention. As stated above, the data 199 itself may include a time attribute and/or a device attribute 220, however, it is appreciated that the time attribute 210 and domain attribute 220 may be stored separate from the data 199. The time attribute 210 may include a time stamp associated with the time the data was transferred to a particular device. When transferring data 199 from one device to another, the domain attribute 220 is compared to the domain attribute associated with the destination device. If they match, the data is enabled to be transferred without restriction. If the domain attributes are different, the transfer of the data is restricted. For example, a time threshold must be satisfied prior to transfer of the data or the transfer of access to the data.

Figure 3:
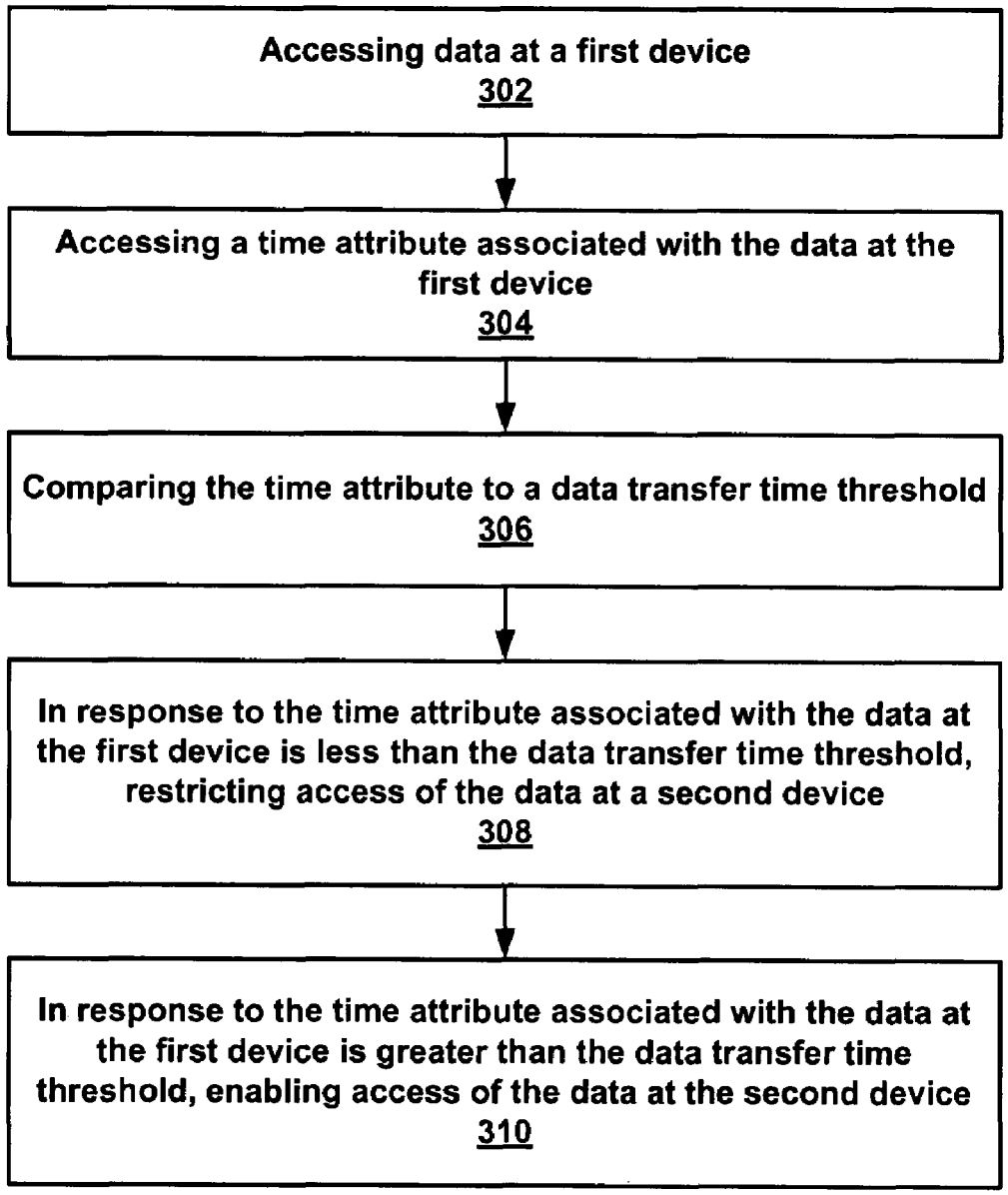
FIG. 3 is a data flow diagram of an exemplary method for controlling transfer of access to data based on a time attribute in accordance with embodiments of the present invention.

FIG. 3 is a data flow diagram of an exemplary method 300 for controlling transfer of access to data based on a time attribute in accordance with embodiments of the present invention. At 302, 300 includes accessing data at a first device.

At 304, 300 includes accessing a time attribute associated with the data at the first device. In one embodiment, the time attribute is a time stamp associated with the data at the time the data is placed onto the device.

At 306, 300 includes comparing the time attribute to a data transfer time threshold. In one embodiment, time thresholds must be satisfied prior to enabling transfer of data from one device to another.

At 308, 300 includes in response to the time attribute associated with the data at the first device is less than the data transfer time threshold, restricting access of the data at a second device.

At 310, 300 includes in response to the time attribute associated with the data at the first device is greater than the data transfer time threshold, enabling access of the data at a second device.

Figure 4:
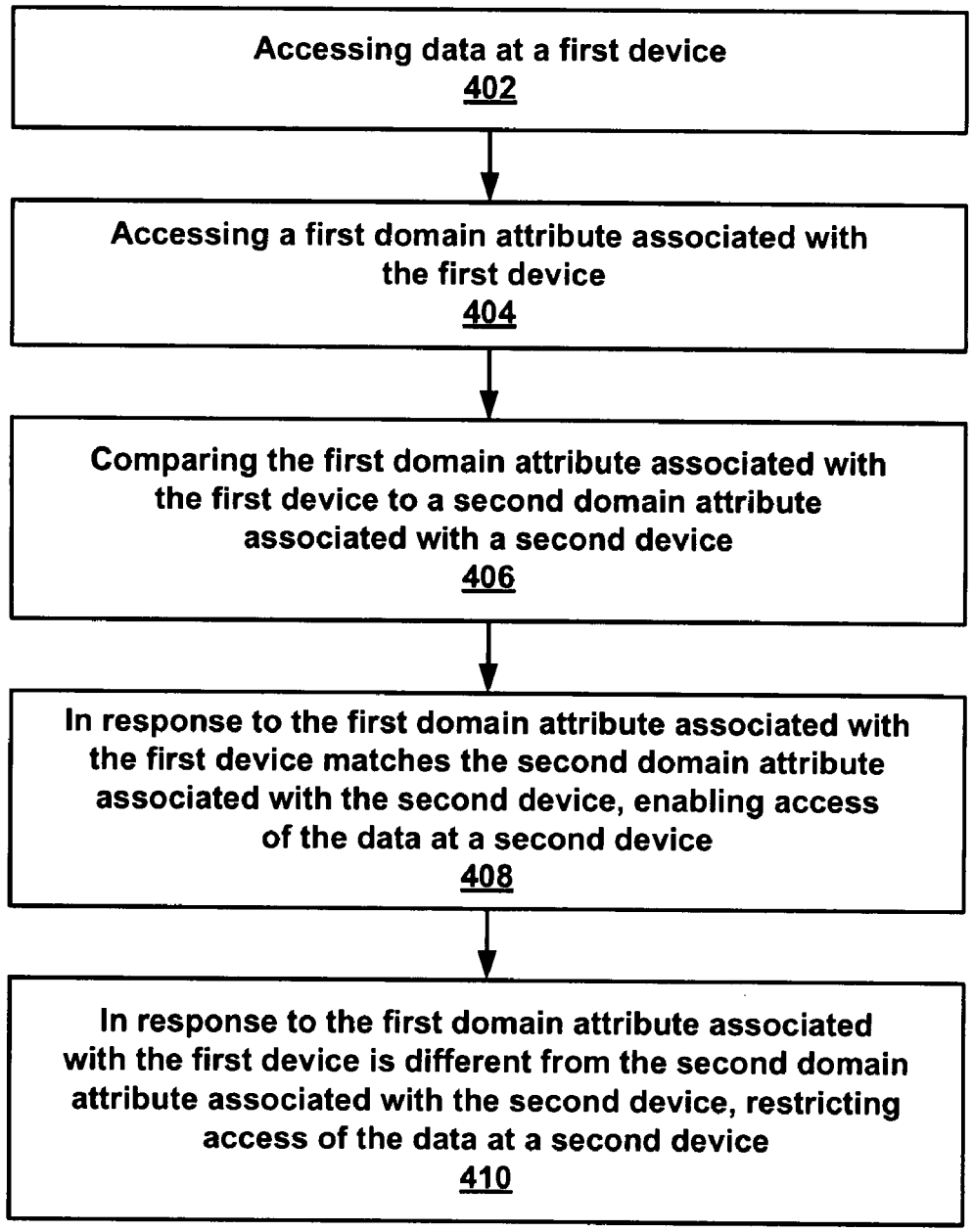
FIG. 4 is a data flow diagram of an exemplary method for controlling transfer of access to data based on a domain attribute in accordance with embodiments of the present invention.

FIG. 4 is a data flow diagram of an exemplary method 400 for controlling transfer of access to data based on a domain attribute in accordance with embodiments of the present invention.

At 402, 400 includes accessing data at a first device.

At 404, 400 includes accessing a first domain attribute associated with the first device.

At 406, 400 includes comparing the first domain attribute associated with the first device to a second domain attribute associated with a second device.

At 408, 400 includes in response to the first domain attribute associated with the first device matches the second domain attribute associated with the second device, enabling access of the data at a second device.

At 410, 400 includes in response to the first domain attribute associated with the first device is different from the second domain attribute associated with the second device, restricting access of the data at the second device.

Embodiments of the present invention limit the transfer of data from one device to another to mimic the physical world. In one embodiment, the concept of a trusted domain is used to enable unrestricted transfer of data from one device to another device in the same domain. In addition, for devices outside the same domain, time friction is used to control the transfer of data from one device to another.

Exemplary Computer System

Figure 5:
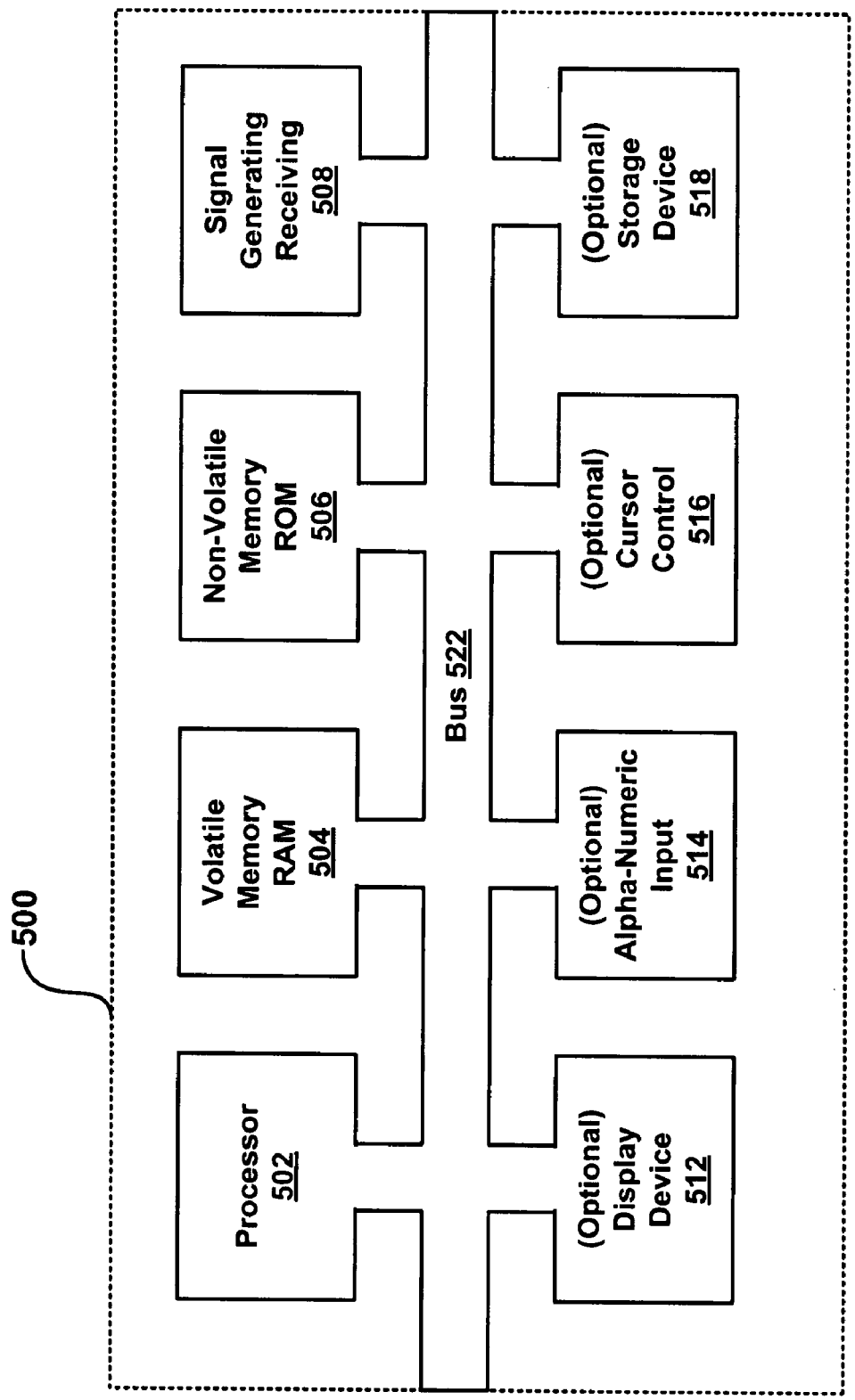
FIG. 5 is a block diagram of an exemplary computer system in accordance with embodiments of the present invention.

With reference to FIG. 5, portions of the present invention are comprised of computer-readable and computer-executable instructions that reside, for example, in computer system 500, which may be used as a part of a general-purpose computer network (not shown). It is appreciated that computer system 500 of FIG. 5 is exemplary only and that the present invention can operate within a number of different computer systems including general-purpose computer systems, embedded computer systems, laptop computer systems, hand-held computer systems, and stand-alone computer systems.

In the present embodiment, computer system 500 includes an address/data bus 522 for conveying digital information between the various components, a central processor unit (CPU) 502 for processing the digital information and instructions, a volatile main memory 504 comprised of volatile random access memory (RAM) for storing the digital information and instructions, and a non-volatile read only memory (ROM) 506 for storing information and instructions of a more permanent nature. In addition, computer system 500 may also include a data storage device 518 (e.g., a magnetic, optical, floppy, or tape drive or the like) for storing vast amounts of data. It should be noted that the software program for outputting information of the present invention can be stored either in volatile memory 504, data storage device 518, or in an external storage device (not shown).

Devices which are optionally coupled to computer system 500 include a display device 512 for displaying information to a computer user, an alpha-numeric input device 514 (e.g., a keyboard), and a cursor control device 516 (e.g., mouse, trackball, light pen, etc.) for inputting data, selections, updates, etc. Computer system 500 can also include a mechanism for emitting an audible signal (not shown).

Furthermore, computer system 500 can include an input/output (I/O) signal unit (e.g., interface) 508 for interfacing with a peripheral device (e.g., a printer, a computer network, modem, mass storage device, etc.). Accordingly, computer system 500 may be coupled in a network, such as a client/server environment, whereby a number of clients (e.g., personal computers, workstations, portable computers, minicomputers, terminals, etc.) are used to run processes for performing desired tasks (e.g., printing, outputting information, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for controlling transfer of data ownership comprising:
   accessing said data at a first device;
   accessing a time attribute associated with said data at said first device;
   comparing said time attribute to a data transfer time threshold;
   in response to said time attribute associated with said data at said first device is less than said data transfer time threshold, restricting access of said data at a second device and continuing to allow accessing said data at said first device; and
   in response to said time attribute associated with said data at said first device is more than said data transfer time threshold, transferring ownership of data to said second device, allowing access of said data at said second device, and restricting access of said data at said first device.

2. The method of claim 1 wherein said time attribute associated with said data at said first device is a length of time said data has been accessible at said first device.

3. The method as described in claim 1 further comprising:
   in response to said time attribute associated with said data at said first device is greater than said data transfer time threshold, enabling access of said data at said second device.

4. The method as described in claim 3 further comprising:
   initiating a time clock associated with said data at said second device.

5. The method as described in claim 3 further comprising:
   transferring said data from said first device to said second device.

6. The method as described in claim 3 further comprising:
   restricting transfer of said data from said second device based on a time period said data has been accessible at said second device.

7. The method as described in claim 1 further comprising:
   in response to said time attribute greater than said data transfer time threshold, transferring a token to said second device, said token enabling said second device to access said data.

8. A method for controlling transfer of data ownership comprising:
   accessing said data at a first device;
   accessing a first domain attribute associated with said first device;
   comparing said first domain attribute associated with said first device to a second domain attribute associated with a second device;
   in response to said first domain attribute associated with said first device matches said second domain attribute associated with said second device, transferring ownership of data to said second device, enabling access of said data at a second device and restricting access of said data at said first device.

9. The method as described in claim 8 further comprising:
   in response to said first domain attribute associated with said first device is different from said second domain attribute associated with said second device, restricting access of said data at a second device.

10. The method as described in claim 8 wherein said domain attribute is associated with an enabled user of said data.

11. The method as described in claim 8 further comprising:
    transferring said data from said first device to said second device.

12. The method as described in claim 8 further comprising:
    transferring a token to said second device, said token enabling said second device to access said data.

13. The method as described in claim 8 further comprising:
    updating a time stamp associated with said data at said second device.

14. A system for restricting transfer of data ownership comprising:
    a data manager module for accessing data at a first device;
    an attribute verification module for verifying attributes associated with said data, said first device and a second device;
    a data transfer restrictor module for restricting ownership transfer of data from said first device to said second device in response to said first domain attribute associated with said first device not matching said second domain attribute associated with said second device and allowing ownership transfer of data in response to said first domain attribute associated with said first device matching said second domain attribute associated with said second device, wherein said second device is able to access said data after said data is transferred to said second device and said first device is unable to access said data after said data is transferred to said second device.

15. The system as described in claim 14 wherein said attribute verification module accesses a first domain attribute associated with said first device and a second domain attribute associated with said second device.

16. The system as described in claim 15 wherein in response to said first domain attribute associated with said first device matches said second domain attribute associated with said second device, said data transfer restrictor module enables access of said data at a second device.

17. The system as described in claim 15 wherein in response to said first domain attribute associated with said first device is different from said second domain attribute associated with said second device, said data transfer restrictor module restricts access of said data at a second device.

18. The system as described in claim 14 wherein said attribute verification module accesses a time attribute associated with said data at said first device and compares said time attribute to a data transfer time threshold.

19. The system as described in claim 18 wherein in response to said time attribute associated with said data at said first device is less than said data transfer time threshold, said data transfer restrictor restricts access of said data at a second device.

20. The system as described in claim 18 wherein in response to said time attribute associated with said data at said first device matches said data transfer time threshold, said data transfer restrictor enables access of said data at a second device.

* * * * *